United States Patent
Johansson

(12) 
(10) Patent No.: US 6,487,423 B1
(45) Date of Patent: Nov. 26, 2002

(54) METHOD AND AN ARRANGEMENT IN A MOBILE RADIO SYSTEM

(75) Inventor: Bernt Johansson, Kista (SE)

(73) Assignee: Telefonaktiebolaget LM Ericsson, Stockholm (SE)

( * ) Notice: Subject to any disclaimer, the term of this patent is extended or adjusted under 35 U.S.C. 154(b) by 0 days.

(21) Appl. No.: 09/468,114

(22) Filed: Dec. 21, 1999

(30) Foreign Application Priority Data

Dec. 22, 1998 (SE) .................................................. 9804511

(51) Int. Cl.[7] .............................. H04B 1/02; H04B 1/38
(52) U.S. Cl. ...................... 455/562; 455/103; 455/132; 455/277.1
(58) Field of Search .................................. 455/103, 132, 455/133, 134, 135, 272, 277.1, 277.2, 503, 561, 562; 370/334, 339

(56) References Cited

U.S. PATENT DOCUMENTS

| | | | |
|---|---|---|---|
| 5,095,535 A | * 3/1992 | Freeburg | 455/277.1 |
| 5,548,806 A | 8/1996 | Yamaguchi et al. | 455/33.1 |
| 5,561,673 A | * 10/1996 | Takai et al. | 455/277.2 |
| 6,173,190 B1 | * 1/2001 | Usui | 455/562 |
| 6,212,406 B1 | * 4/2001 | Keskitalo et al. | 455/562 |

FOREIGN PATENT DOCUMENTS

| | | |
|---|---|---|
| EP | 0 352 787 A2 | 1/1990 |
| EP | 0 717 577 A2 | 6/1996 |
| WO | WO 95/31070 | 11/1995 |

* cited by examiner

Primary Examiner—Nay Maung

(57) ABSTRACT

The invention relates to a method and an arrangement for establishing a connection between two fixed nodes in a mobile radio system. Adaptive antennas are utilized to achieve narrow beams. The connection is established via a reflecting body.

12 Claims, 5 Drawing Sheets

METHOD AND AN ARRANGEMENT IN A MOBILE RADIO SYSTEM

This application claims priority under 35 U.S.C. §§119 and/or 365 to 9804511-5 filed in Sweden on Dec. 22, 1998; the entire content of which is hereby incorporated by reference.

TECHNICAL FIELD OF THE INVENTION

The present invention relates to a method and an arrangement for transferring data or voice via radio between two nodes in a mobile radio system.

DESCRIPTION OF RELATED ART

In public land mobile networks, PLMNs, the geographic area to which the network provides services, such as voice and data traffic, is divided into cells. A cell, in this context, is a limited geographic area to which these services are provided by a certain base transceiver station, BTS, belonging to the network.

The size of the cell is normally set depending on the traffic density in the area in question. In most systems it is possible to provide a small cell within a larger cell, meaning that a subscriber station residing in the smaller cell may communicate with both the BTS associated with the smaller cell and the BTS associated with the larger cell. This allows the system to provide extra system capacity to so called "hot spots" where the traffic density is high. These BTSs should then utilise different frequency bands.

A clear trend in mobile telephony system is an increase in the number of small and very small cells, sometimes named "microcells" or even "picocells". This results in more flexible systems with an overall increased system capacity.

When a new BTS is introduced it must be connected to the next hierarchical level of the PLMN, which in the GSM case is a base station controller, a BSC. Normally this is arranged by means of a wired connection, i.e. a cable. When the number of small cells increases, however, this approach becomes expensive and cumbersome. A feasible method to overcome this problem is to use a radio link to provide contact between the master node, the BSC and the slave node, the BTS. It should be noted that each master node may be associated with a number of slave nodes. This, however, requires relatively high powered radio transmitters and accurate frequency planning. It also requires sophisticated receivers capable of compensating for multipath fading. This may be accomplished by means of rake-receivers or equalisers. The cost of such equipment is normally substantially higher than the costs of a wired connection.

Another approach for connecting a BSC to a BTS is to provide a regular microwave link between the two nodes. This may then be performed with directional antennas at both nodes accomplishing up- and downlinks in narrow beams between them. This may be performed with relatively low powered transmitters and simple receivers and does not normally require any complicated frequency planning. For this approach to be possible, however, it is necessary to have a line of sight between the respective antennas. This often difficult to accomplish in densely populated areas. Moreover, if the line of sight is disturbed by a temporarily shadowing object the communication between the nodes is shut down.

SUMMARY OF THE INVENTION

In mobile systems, and especially in so called point to multipoint, P-MP systems designed for transmission with high requirements on radio-link performance, multipath propagation is quite destructive for such performance. This is particularly the case when no line of sight exists between transmitter and receiver due to obstacles. As a measure of link performance, bit error rate, BER may be used, where BER≈½*square(S/T), where S is rms delay and T is transmitted symbol duration. A normal way to encounter this problem is to introduce equalisers in TDMA systems and so called RAKE-receivers CDMA systems and to combine these features with different kinds of coding. In high bitrate systems equalisers and RAKE receivers are expensive and cumbersome to implement. They also introduce delay into the system due to base band processing.

One object of the present invention is therefore to provide a method for accomplishing a flexible and inexpensive connection between two, preferably fixed, nodes in a mobile telephony system, where the connection carries data or voice traffic which is sensitive to delay due to multipath propagation and/or fading.

This object is fulfilled by a method for transferring data or voice traffic between first and second fixed nodes in a mobile radio system, where each node includes an adaptive phase controlled antenna unit. A first link is established where the first node transmits radio signals to the second node in a narrow beam deliberately via a reflecting body. A second link is established where the second node transmits radio signals to the first node in a narrow beam deliberately via a reflecting body. The direction of transmission of the second link is then the direction of reception of the signal received from the first link. This method results in a flexible communication link between the nodes that functions properly even if there is no line of sight between the two nodes. The transmitters may be relatively low powered and the receivers need not compensate for multipath fading. The connection is flexible and may be adjusted as a result of a changing electrical environment.

In an embodiment of the invention the first and second links are established in a common radio frequency band. This frequency band is then shared by using time division duplex, TDD. This allows the links to be set up using a more limited frequency band, no guard band is required between duplex bands.

In another embodiment of the invention the first and second links are established in different radio frequency bands, using frequency division duplex, FDD. Then the duplex distance between the links should be less than 2 percent. This allows the up- and downlinks to be established along the same path (albeit in different directions) and results in less expensive transmitters and receivers.

Another object of the present invention is to provide an arrangement for accomplishing a flexible and inexpensive connection between two, preferably fixed, nodes in a mobile telephony system.

This object is fulfilled by an arrangement for transferring data or voice between first and second nodes in a mobile radio system, where each node includes a phase controlled antenna unit. The arrangement then includes means for establishing a first radio link is where the first node transmits radio signals to the second node in a narrow beam deliberately via a reflecting body. It furthermore includes means for establishing a second radio link where the second node transmits radio signals to the first node in a narrow beam deliberately via a reflecting body. The direction of transmission of the second link is then the direction of reception of the first link. This results in a flexible communication link between the nodes that functions properly even if there is no line of sight between the two nodes. The transmitters may be relatively low powered and the receivers need not compensate for multipath fading.

In a preferred embodiment the first node is connected to a base station controller and that the second node is connected to a base transceiver station. This allows the invention to be used in order to simplify cell planning activities.

DESCRIPTION OF PREFERRED EMBODIMENTS

Figures 1, 2:
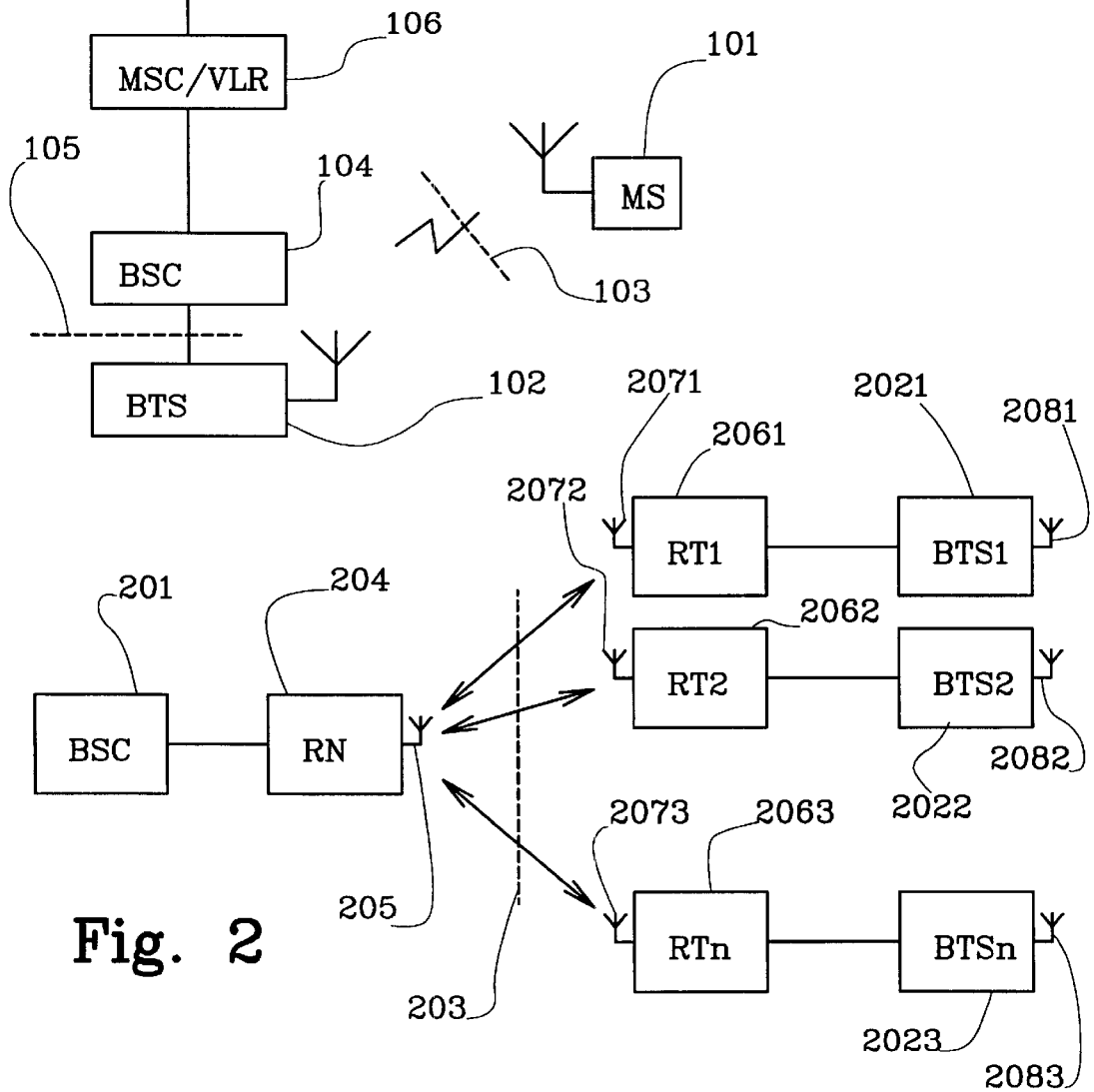
FIG. 1 illustrates, schematically, a mobile system according to the GSM standard.
FIG. 2 shows a block diagram of a base station controller wirelessly interconnected, in accordance with the invention, with a plurality of base transceiver stations.

FIG. 1 illustrates, schematically, a mobile system according to the GSM standard. A mobile station 101 communicates with a base transceiver station, BTS 102 via the air interface, Um 103. The BTS provides coverage to a predetermined geographic area, a cell. Numerous mobile stations may communicate with the BTS simultaneously. Each BTS is connected to a base station controller, a BSC 104 via a second interface, the so called Abis interface, 105. This connection is normally provided by means of a fixed connection, but as will be described below, a wireless connection is also possible. This invention deals primarily with the connection between the BSC and the BTS. It is to be noted, however, that the invention in principle functions also for the interface 103 between the BTS 102 and the mobile station 101. This, however, requires that the mobile station is provided with means for accomplishing a narrow, steerable antenna beam.

The BSC performs channel configuration and handover functions for a plurality of BTSs and is in its turn connected to a mobile services switching centre, MSC 106. The MSC performs switching functions for a number of subordinated BSCs. A visitor location register, VLR is integrated with the MSC. The VLR is a data base that keeps track of subscribers residing in the subordinated cells. The MSCs of the mobile system are interconnected so as to form a network. Some MSCs in this network are called gateway mobile services switching centres G-MSCs 107 and function as gateways to external circuit switched networks 108, such as PSTN and ISDN networks.

FIG. 2 shows a base station controller, BSC 201 wirelessly interconnected, in accordance with the invention, with a plurality of base transceiver stations, BTSs 2021, 2022, 2023. This type of connection may be called a point to multipoint connection or P-MP connection. In this case only wireless connections are used over the BSC/BTS interface 205. In accordance with the invention, however, a mix between fixed and wireless connections may be employed.

The BSC is connected to a radio node 204, provided with an adaptive radio antenna 205. The radio node 204 is provided for maintaining contact with a plurality of radio terminals 2061, 2062, 2063, each of which is provided with an adaptive antenna 2071, 2072, 2073 and connected to a BTS 2021, 2022, 2023. Each of the BTSs in turn are provided with an antenna 2081, 2082, 2083 used for communication with mobile stations. In FIG. 2 the radio node 204 is illustrated as being separate from the BSC 201, it may however also be integrated into the BSC. Likewise, any radio terminal 2061 may, if suitable, be integrated into a BTS 2021.

Figure 3A:
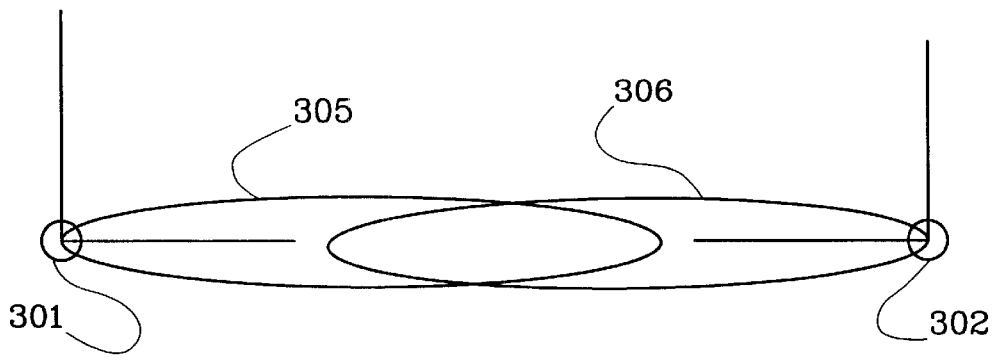
FIG. 3a illustrates an undisturbed transmission situation between two nodes.
Figure 3B:
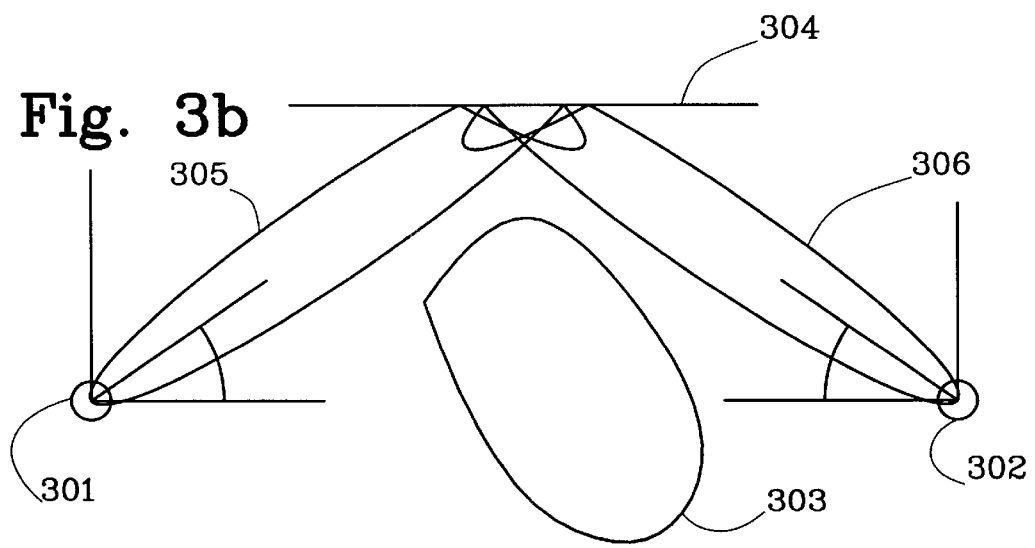
FIG. 3b illustrates a transmission situation according to the invention between two nodes where the line of sight is disturbed by an interposed obstacle.
Figure 3C:
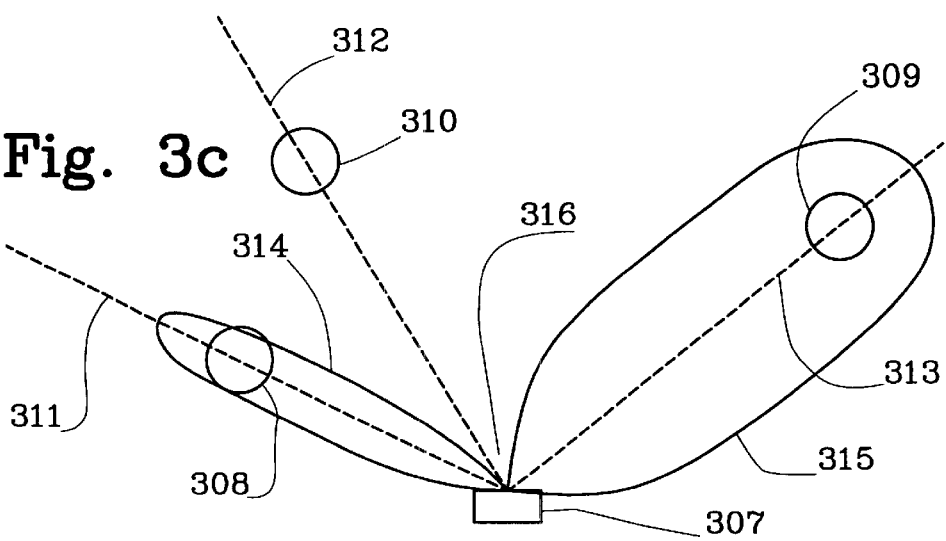
FIG. 3c shows a possible antenna pattern for an adaptive antenna in such a transmission situation.

FIGS. 3a and 3b illustrates two possible transmission situations for an arrangement according to the invention. FIG. 3c shows a possible antenna pattern for an adaptive antenna in such a transmission situation.

FIG. 3a shows the simplest case where there is a line of sight between a radio node 301 and a terminal node 302. The adaptive antenna of the radio node 301 is then set to form a beam 305 directly towards the radio terminal 302. Similarly, the adaptive antenna of the terminal node 302 is set to form a beam 306 directly towards the radio node 301. This transmission situation could be dealt with by using a conventional microwave link having a directional antenna. It is to be noted, however, that such an arrangement will only function properly as long as the line of sight is undisturbed, whereas the method and the arrangement according to the invention is more flexible and may deal with a situation where the line of sight is disturbed, as will be shown below.

FIG. 3b shows another case where the transmission situation is more complicated. An obstacle 303 disturbs the line of sight between the radio node 301 and the radio terminal 302. This may have been the case when the BTS associated with the radio terminal 302 was set up, in which case the obstacle 303 is most likely to be a building. It may however also be the case that a transmission situation as shown in FIG. 3a is suddenly disturbed by an obstacle appearing in the line of sight, in this case the obstacle is likely to be a vehicle.

If data with high bitrate is to be transmitted between the nodes, the transmission environment according to FIG. 3a will not imply any significant difficulties. Possible fading and/or reflections from any surrounding obstacles will only result in attenuated reflections which either has no detrimental effect at or can be cancelled out by means of an equaliser.

Under the circumstances shown in FIG. 3b, however, and if the same antenna directions as in FIG. 3a were to be maintained, severe delays and attenuation of the main beam will appear and the data bits in the transmission would be severely deteriorated. According to the present invention therefore, the antenna direction deliberately changed to a new direction as shown in FIG. 3b. In this way any reflection of the transmission is in itself used and unwanted multipath propagation beams can be reduced in order to improve the bit error rate, BER performance. Also line of sight requirements can be overcome, and the need for equalisers and RAKE-receivers may be eliminated.

Since both the radio node 301 and the terminal node 302 are provided with adaptive antennas in accordance with the invention, up- and downlinks may in this case be established via a reflecting body 304. The respective antennas of the radio node and the terminal node then form relatively narrow beams 305, 306. The adaptive antennas are preferably phase controlled as is known in the art. The nodes transmit signals in the same direction as they are received from the other node and they may be considered to be reciprocal. In a preferred embodiment, the up- and downlinks can use a common frequency band by using time division duplex, TDD. As an alternative, frequency division duplex may be used, as long as the duplex distance between up- and downlink is less than 2 percent. In principle, larger duplex distances are possible if different paths can be used for up- and downlink. This, however, requires a more complicated protocol for establishing a connection and a more complex radio equipment since different antenna patterns are needed for transmission and reception.

Figure 4A:
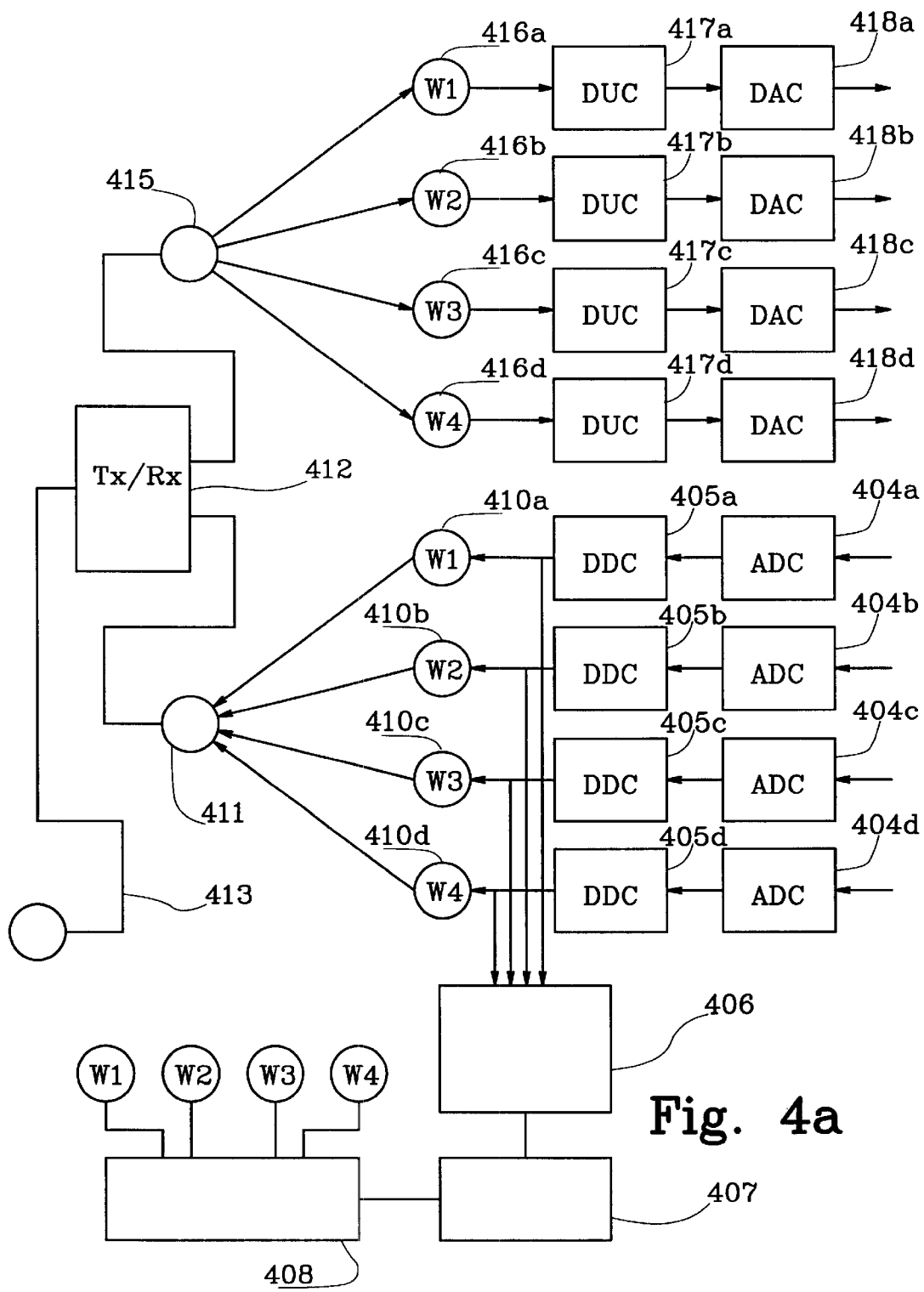
FIGS. 4a and 4b show a system for beam-steering for an arrangement according to the invention.
Figure 4B:
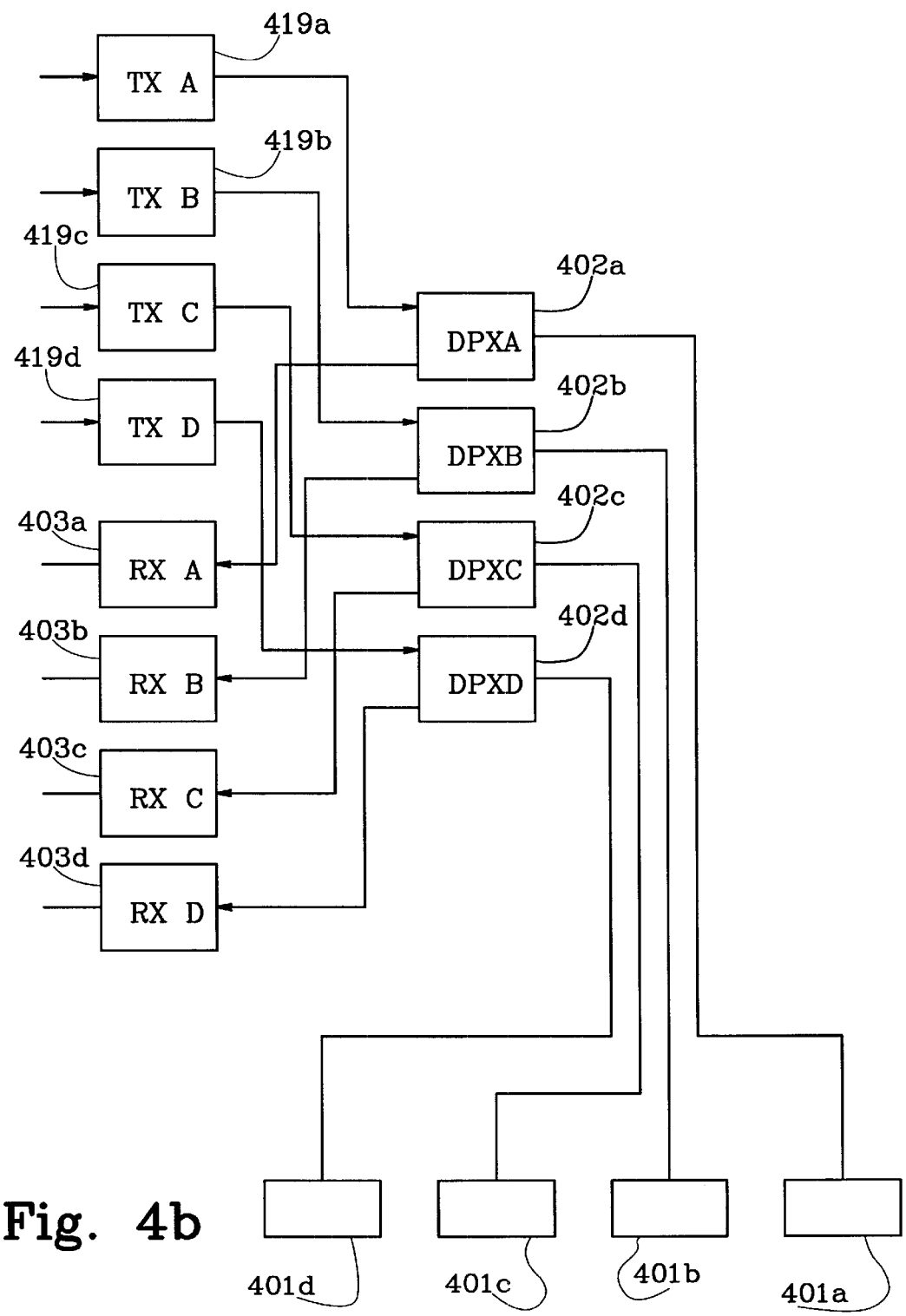

FIG. 3c shows, very schematically, a possible antenna pattern for an adaptive antenna in such a transmission situation as is shown in FIG. 3b. The antenna 307 of a radio node is exposed to incoming signals from three different sources. The signals from two sources 308, 309 such as radio terminals, are considered to be the desired signals, but the signal from a third source 310 is considered to be an interfering signal. Three different directions of arrival 311, 312, 313 are established for the three sources. From these three angles the antenna is adjusted as is known in the art so as to form beams of high antenna gain 314, 315 in the directions of the desired signals and a null 316 in the direction of the interfering source. In the case of an antenna pattern for a radio terminal only one main beam is likely to be used. FIGS. 4a and 4b show a system for beam-steering for an arrangement according to the invention. The basic concept for such beam-steering is described in, for instance, "Digital beamforming in wireless communications", John Litva and Titus Kwok-Yeung LO, Artech House ISBN 0-89006-712-0, 1996 and "Direction finding, beamforming and mutual coupling in base station antenna arrays", Staffan Lundgren, Chalmers University of Technology, January 1998, which are incorporated herein by reference.

FIG. 4a shows a first section of a radio arrangement with beam steering functionality according to the invention. The first section involves a digital radio. FIG. 4b illustrates a second section involving a wideband radio and an antenna system. The arrangement is now described in more detail with reference to both FIGS. 4a and 4b.

Starting in FIG. 4b radio signals are received by antenna elements 401a–401d. In this embodiment four elements are used, but the number of elements may be much larger. Generally, the more antenna elements that are used, the more complex antenna gain patterns may be generated. Incoming signals are coupled by duplex filters 402a–402d to receiver circuits 403a–403d. The duplex filters allow each antenna element to be used for both transmitting and receiving.

The receiver circuits 403a–403d filter the incoming signals and mix them down to an intermediate frequency. Next, with reference now made to FIG. 4a, the signals are converted from analogue to digital by A/D-converters 404a–404d. The respective digital signals are then shifted to low frequencies by means of digital down converters 405a–405d.

At this stage the incoming signals are used to perform the beam forming functions of the arrangement according to the invention. The signals are lead to the covariance block 406.

The covariance block 406 buffers a number of signal samples from each of its incoming branches. These samples form together a matrix and a covariance matrix is calculated from this matrix. This covariance matrix is continuously outputted to a direction of arrival block 407, which calculates the directions of arrivals of signals from both desired and interfering signal sources out of the incoming covariance matrix. A control unit (not shown) decides which signals are desired and which are interfering.

The directions of incoming signals from desired signal sources and interferers are outputted to the weight calculation block 408. This block calculates suitable weights w1, w2, w3, w4 which ensures that the antenna gain pattern has beams in the direction of the desired signal sources and nulls in the direction of the interferers. The amplitude and phase of the digital signals incoming from The digital down converters are adjusted by the weighting locks 410a–410d. These signals are then added in an adding lock 411. This results in a signal where the interfering signals have been just about cancelled, whereas the signals originating from desired signal sources are amplified. The blocks used for calculating weight from incoming signals 406, 407, 408 have, for clarity reasons, been drawn as discrete function blocks. It is to be noted, however, that the steps of these blocks, just as well most other digital functions shown in FIG. 4a, may be performed by a single digital signal processor, DSP.

The signals may then be further processed in a Tx/Rx function block 412, whereafter the information transmitted by means of the signal is sent over a pulse code modulation link, PCM 413 to, in the GSM case, a BSC.

The transmission side of the arrangement operates in a similar way as the reception side. Information coming from, in the GSM case, a BSC is received on a pulse code modulated link 413. The information is transformed into a signal suitable for radio transmission in a Tx/Rx function block 412. This signal is then digitally splitted into four signals in a splitting block 415. The amplitude and phase of these signals are adjusted by weighting blocks 416a–416d.

The weights are complexly multiplied to the signals. Since the direction of transmission in accordance with the invention should be identical to the direction of reception of the signals from the other node, i.e; the antenna is reciprocal, the weights in the transmission side should be identical to the weights in the reception side.

The signals are converted to an intermediate frequency by means of digital up converters 417a–417d. Then they are converted to be analogue by D/A-converters 418a–418d. The analogue signal is transformed to radio frequency by transmitter circuits 419a–419d and then led via the duplex filters 402a–402d to the antenna elements 401a–401d.

Figure 5:
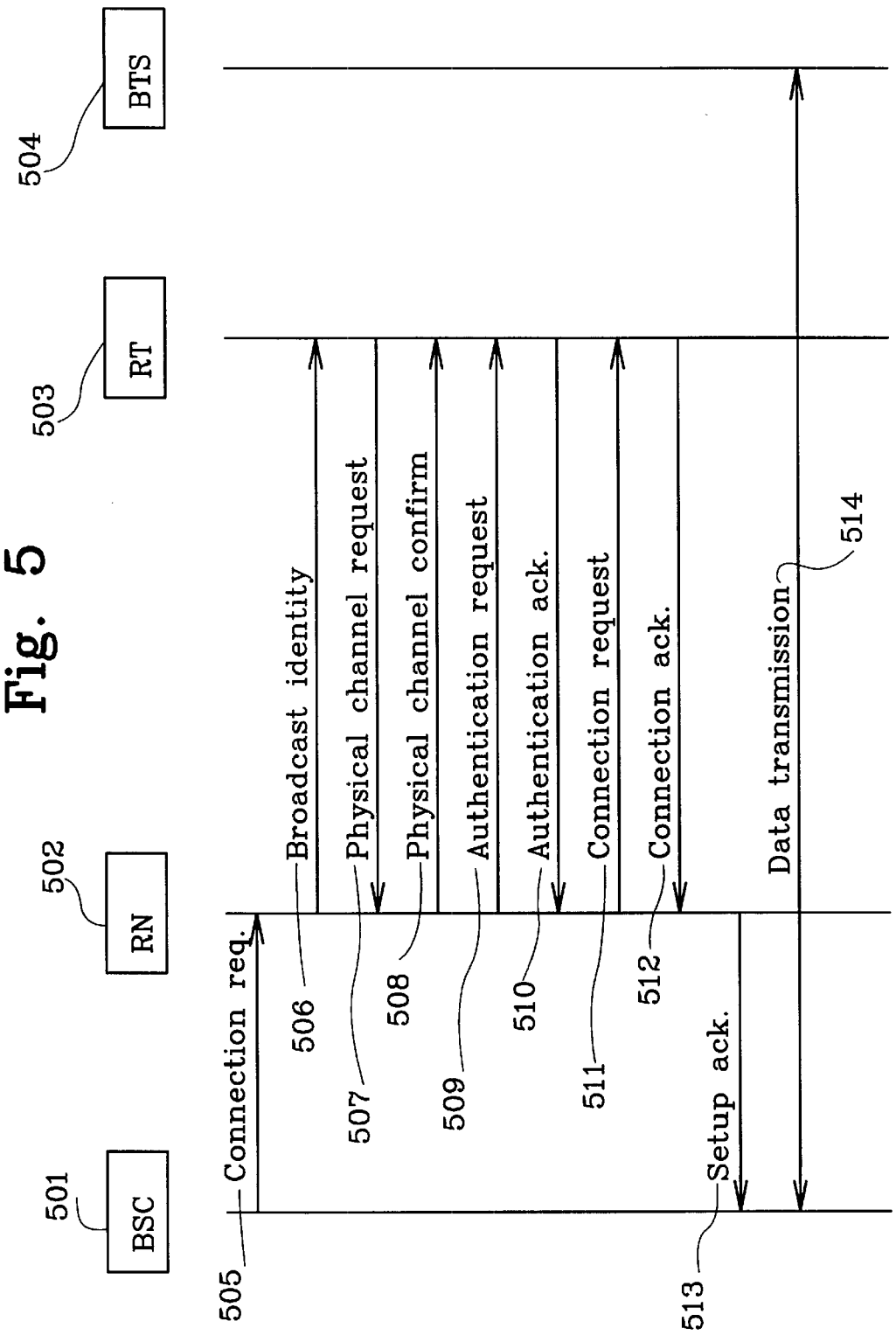
FIG. 5 illustrates a signalling diagram for a connection set-up procedure in a system according to the invention.

FIG. 5 illustrates a signalling diagram for a connection set-up procedure in a system according to the invention. When the connection is to be set up the BSC 501 transmits a connection request 505 to the radio node 502. The radio node 502 then broadcasts 506 an identification number broadcast message in a relevant sector without using active beamforming. This message is picked up by a radio terminal 503. If the radio terminal recognises the identity transmitted and thus is the correct receiver it responses by sending a physical channel request message 507 to the radio node 502. This is done with active beamforming in a preferred direction estimated by the radio terminal.

Then the radio node 502 transmits a physical channel confirm message 508 to the radio terminal 503 in the same direction from where the foregoing message 507 was received. Active beamforming has thus now started also at the site of the radio node 502. An authentication request 509 is then sent by the radio node 502 to the radio terminal 503, which results in an authentication acknowledge 510 in the opposite direction. In the same manner connect request 511 and connect acknowledge 512 are exchanged. When this is done the radio node 502 and the radio terminal 503 are ready for transmission. A set-up acknowledge message 513 is sent from the radio node 502 to the BSC 501 and transmission of data 514 between the BSC 501 and the BTS 504 may begin.

It is to be noted that the above mentioned embodiment only seek to exemplify how the invention may be carried out. The scope of protection sought is only limited by the attached claims.

What is claimed is:

1. Method for transferring data or voice via radio between a first fixed node and a second fixed node in a mobile radio system, each of said nodes including at least one phase controlled antenna unit, said method comprising the following steps:

establishing a first link where the first node transmits radio signals to the second node in a narrow beam intentionally via a reflecting body; and establishing a second link where the second node transmits radio signals to the first node in a narrow beam intentionally via a reflecting body, where the direction of transmission of the second link is the direction of reception of the signals from the first link;

wherein said first link and said second link are established in a common radio frequency band and that this frequency band is shared by using time division duplex, TDD.

2. Method for transferring data or voice via radio between a first fixed node and a second fixed node in a mobile radio system, each of said nodes including at least one phase controlled antenna unit, said method comprising the following steps:

establishing a first link where the first node transmits radio signals to the second node in a narrow beam intentionally via a reflecting body; and establishing a second link where the second node transmits radio signals to the first node in a narrow beam intentionally via a reflecting body, where the direction of transmission of the second link is the direction of reception of the signals from the first link;

wherein said first link and said second link are established in different radio frequency bands, using frequency division duplex, FDD, and that the duplex distance between the links is less than 2 percent.

3. An arrangement for transferring data or voice via radio between a first node and a second node in a mobile radio system, each of said nodes including at least one phase controlled antenna unit, said system comprising:

means for establishing a first link where the first node transmits radio signals to the second node in a narrow beam intentionally via a reflecting body; and means for establishing a second link where the second node transmits radio signals to the first node in a narrow beam intentionally via a reflecting body, where the direction of transmission of the second link is the direction of reception of the signals from the first link;

wherein said first link and said second link are established in a common radio frequency band and that this frequency band is shared by using time division duplex, TDD.

4. An arrangement for transferring data or voice via radio between a first node and a second node in a mobile radio system as claimed in claim 3, wherein the first node is connected to a base station controller and that the second node is connected to a base transceiver station.

5. An arrangement for transferring data or voice via radio between a first node and a second node in a mobile radio system as claimed in claim 3, wherein the first and the second nodes are fixed.

6. An arrangement for transferring data or voice via radio between a first node and a second node in a mobile radio system as claimed in claim 3, wherein the first node communicates with multiple nodes of the second node type.

7. An arrangement for transferring data or voice via radio between a first node and a second node in a mobile radio system as claimed in claim 3, wherein the means for achieving a null in the direction off an interfering radio signal source, for an antenna pattern in at least one of the first and second nodes.

8. An arrangement for transferring data or voice via radio between a first node and a second node in a mobile radio system, each of said nodes including at least one phase controlled antenna unit, said system comprising:

means for establishing a first link where the first node transmits radio signals to the second node in a narrow beam intentionally via a reflecting body; and means for establishing a second link where the second node transmits radio signals to the first node in a narrow beam intentionally via a reflecting body, where the direction of transmission of the second link is the direction of reception of the signals from the first link;

wherein said first link and said second link are established in different radio frequency bands, using frequency division duplex, FDD, and that the duplex distance between the links is less than 2 percent.

9. An arrangement for transferring data or voice via radio between a first node and a second node in a mobile radio system as claimed in claim 8, wherein the first node is connected to a base station controller and that the second node is connected to a base transceiver station.

10. An arrangement for transferring data or voice via radio between a first node and a second node in a mobile radio system as claimed in claim 8, wherein the first and the second nodes are fixed.

11. An arrangement for transferring data or voice via radio between a first node and a second node in a mobile radio system as claimed in claim 8, wherein the first node communicates with multiple nodes of the second node type.

12. An arrangement for transferring data or voice via radio between a first node and a second node in a mobile radio system as claimed in claim 8, wherein the means for achieving a null in the direction off an interfering radio signal source, for an antenna pattern in at least one of the first and second nodes.

* * * * *